(12) United States Patent (10) Patent No.: US 8,538,900 B2
Ganai et al. (45) Date of Patent: Sep. 17, 2013

(54) INTEGRATING INTERVAL CONSTRAINT PROPAGATION WITH NONLINEAR REAL ARITHMETIC

(75) Inventors: Malay K. Ganai, Plainsboro, NJ (US); Sicun Gao, Pittsburg, PA (US); Franjo Ivancic, Princeton, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 374 days.

(21) Appl. No.: 12/966,710

(22) Filed: Dec. 13, 2010

(65) Prior Publication Data

US 2011/0173148 A1    Jul. 14, 2011

Related U.S. Application Data

(60) Provisional application No. 61/293,326, filed on Jan. 8, 2010.

(51) Int. Cl.
*G06F 15/18* (2006.01)
*G06F 7/60* (2006.01)

(52) U.S. Cl.
USPC .................................................. 706/19; 703/2

(58) Field of Classification Search
None
See application file for complete search history.

(56) References Cited

PUBLICATIONS

From Prolog III to Prolog IV: The Logic of Constraint Programming Revisited, Guy A. NarBoni, 1999, Constraints: An Internation Journal.*

"An introduction to interval-based constraint processing", Renker et al., 2006, Archives of Control Sciences.*
Intergrating ICP and LRA Solvers for Deciding Nonlinear Real Arithmetic Problems, Gao, et al., 2010 FMCAD, Inc.*
Akbarpour, J., et al., "MetiTarski: An Automatic Prover for the Elementary Functions", AISC/MKM/ Calculemus 2008—pp. 217-231.
Bauer, A., et al., "Tool-Support for the Analysis of Hybrid Systems and Models", Date 2007—pp. 924-929.
Ganai M., et al., "Efficient Decision Procedure for Non-Linear Arithmetic Using Cordic", FMCAD 2009—10 pages.

* cited by examiner

*Primary Examiner* — Alan Chen
(74) *Attorney, Agent, or Firm* — Joseph Kolodka

(57) ABSTRACT

A system and method for deciding the satisfiability of a non-linear real decision problem is disclosed. Linear and non-linear constraints associated with the problem are separated. The feasibility of the linear constraints is determined using a linear solver. The feasibility of the non-linear constraints is determined using a non-linear solver which employs interval constraint propagation. The interval solutions obtained from the non-linear solver are validated using the linear solver. If the solutions cannot be validated, linear constraints are learned to refine a search space associated with the problem. The learned constraints and the non-linear constraints are iteratively solved using the non-linear solver until either a feasible solution is obtained or no solution is possible.

19 Claims, 3 Drawing Sheets

INTEGRATING INTERVAL CONSTRAINT PROPAGATION WITH NONLINEAR REAL ARITHMETIC

RELATED APPLICATION INFORMATION

This application claims priority to provisional application Ser. No. 61/293,326 filed on Jan. 8, 2010, incorporated herein by reference.

BACKGROUND

1. Technical Field

The present invention relates to solving non-linear real decision problems, and more particularly, to a solver which separately handles Boolean, linear and non-linear solving phases.

2. Description of the Related Art

Modern program analysis and verification tools include solvers which are used for Satisfiability Modulo Theories (SMT) problems. While SMT solvers have been improved in recent years for linear problems, there has been little progress with respect to providing a sufficient SMT solver for non-linear real problems, particularly with respect to quantifier-free non-linear (QFNR) decision problems. Consequently, there is no generally accepted design for solvers handling QFNR or non-linear problems, and these types of problems still present major difficulties in nearly all domains.

A major problem associated with conventional solvers relates to the fact that they handle linear and non-linear constraints in the same or similar manner. In doing so, conventional solvers neglect the fact that linear constraints can be handled differently from non-linear constraints in manner that is more complete, accurate, and efficient.

SUMMARY

In accordance with the present principles, a method is disclosed for deciding the satisfiability of a non-linear real decision problem. Linear and non-linear constraints associated with the problem are separated. The feasibility of the linear constraints is determined using a linear solver. The feasibility of the non-linear constraints is determined using a non-linear solver which employs interval constraint propagation. The interval solutions obtained from the non-linear solver are validated using the linear solver.

In accordance with the present principles, a system is disclosed for deciding the satisfiability of a non-linear real decision problem. The system includes a non-linear solver for determining the feasibility of non-linear constraints using interval constraint propagation (ICP). A linear solver is used to determine the feasibility of linear constraints and for validating interval solutions obtained from the non-linear solver.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
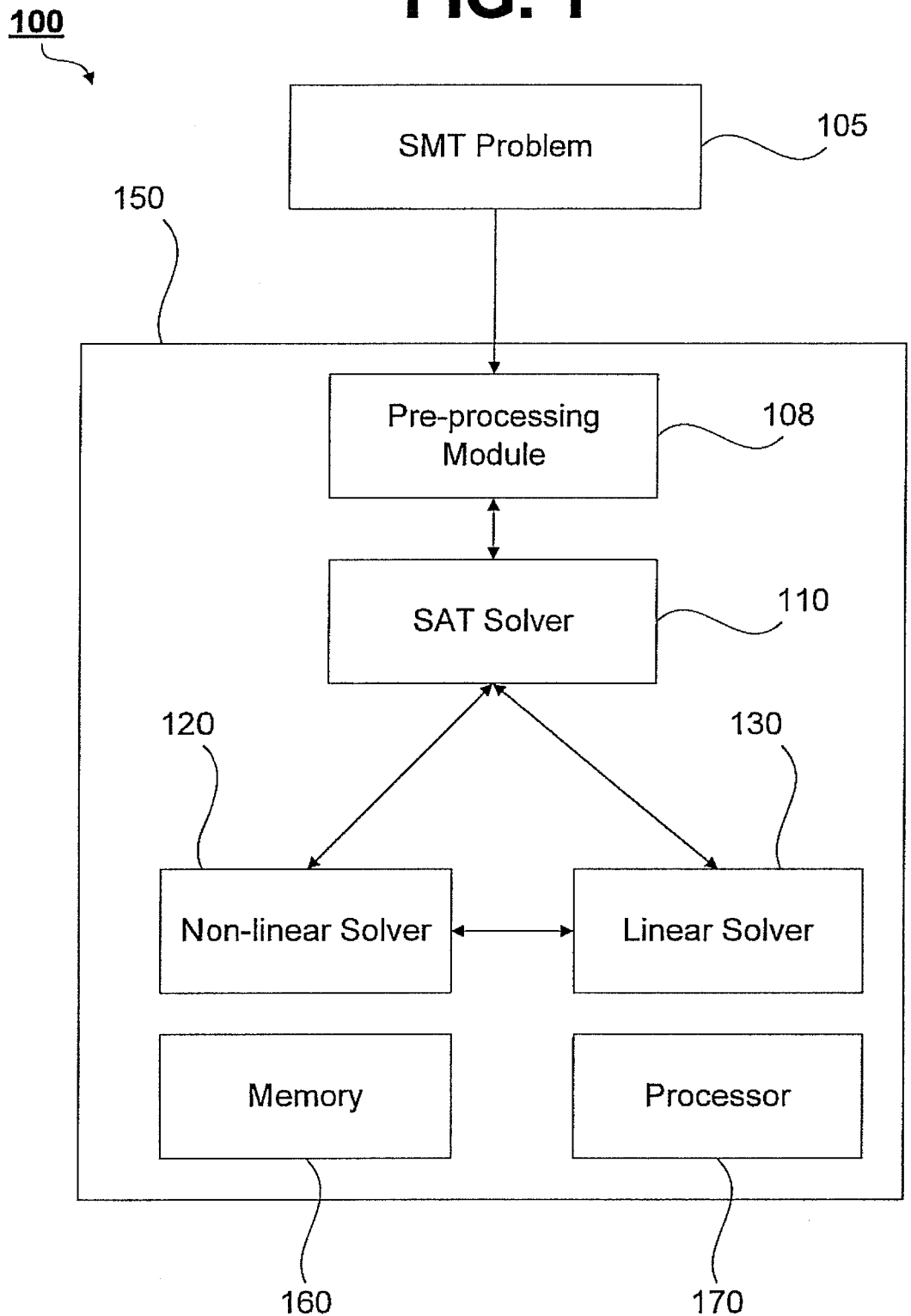
FIG. 1 is a block/flow diagram of an SMT solver in accordance with an embodiment of the present principles.

In accordance with the present principles, a scalable decision procedure is provided for quantifier-free non-linear (QFNR) decision problems within a given precision requirement. More particularly, a Satisfiability Modulo Theories (SMT) solver is described which employs a lazy Davis-Putnam-Logemann-Loveland (DPLL(T)) framework that separates Boolean, linear and non-linear phases of an SMT problem. A different solver is used for each of these solving phases.

A DPLL(T)-based Boolean satisfiability (SAT) solver is applied to a Boolean abstraction of the QFNR decision problem. To generate the abstraction of a QFNR problem, a given formula is initially processed to determine symbolic bounds on the real variables set forth in the problem. These symbolic bounds (i.e., theory atoms) correspond to new Boolean variables in the abstraction. If the abstraction is Boolean-satisfiable, the SAT solver returns a satisfying assignment for all the Boolean variables. In this case, the set of theory atoms corresponding to the satisfying assignment of Boolean variables are checked for theory consistency.

To determine theory consistency, the SAT solver interfaces with two separate theory solvers for handling linear and non-linear constraints. Both theory solvers take a set of theory atoms as input and return a value which indicates whether the set of theory atoms is consistent. In preferred embodiments, a simplex-based solver is used to handle the linear constraints, while an interval constraint propagation (ICP) based solver is used to handle non-linear constraints. There is a tight integration between the linear and non-linear constraint solving phases that supports direct exchange of information to prune the search space.

More specifically, the interaction between linear and non-linear constraint solving phases is implemented as part of a set of checking procedures. Linear checking procedures (e.g., involving simplex-based operations) are first used to check the feasibility of the linear constraints within the bounds set on the real variables and to check for linear conflicts. If the linear constraints are unsatisfiable, then a theory lemma is added to the Boolean abstraction and the DPLL solver searches for a new Boolean solution. If the linear constraints are satisfiable, then ICP is applied to check the feasibility of the non-linear constraints within the bounds. If the ICP solver cannot find a solution, then a theory lemma is added to the Boolean abstraction and the DPLL solver searches for a new Boolean solution. If the non-linear constraints are deemed to be feasible, ICP is used to generate a set of interval solutions for the variables. The solutions produced by ICP are further validated using the linear solver on the linear constraints.

The validation steps include checking if the mid-point of the interval solution obtained from ICP solver is consistent with the linear constraints, and returning invalid result if not. A further check is performed to determine if the midpoint of the interval solution is at least a mid-point distance from the boundary of the linear feasible region. If the midpoint of the interval solution is at least a mid-point distance from the boundary, then a valid result is returned. Otherwise, an invalid result is returned and the linear constraints that failed in the above checks are identified as learned linear constraints.

If necessary, the abstraction generated for the QFNR problem is refined when a solution produced in the non-linear constraint solving phase cannot be validated. In this case, the learned linear constraints are added to the ICP solver for searching different interval solutions. This iterative procedure of adding learned linear constraints to the ICP solver terminates either when an interval solution produced by the ICP solver is determined to be valid or when the ICP solver cannot find a solution.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram illustratively depicts a system 100 for implementing a SMT solver 150 in accordance with the present principles. The SMT solver 150 disclosed therein may be utilized in a variety of different contexts. In certain embodiments, SMT solver 150 may be used in conjunction with a program verification application or program analysis application.

As shown in FIG. 1, an SMT problem 105 is received by the SMT solver 150. The SMT problem 105 may relate to a quantifier-free non-linear (QFNR) decision problem that involves both linear and non-linear operations on real numbers. The SMT solver 150 is comprised of three separate solvers: SAT solver 110, non-linear solver 120 and linear solver 130. The SMT solver 150 also comprises memory storage (e.g., RAM, ROM, PROM, etc.) for storing data and a processor 170 for executing instructions. Both the memory 160 and the processor 170 are accessible to, and in communication with, solvers 110, 120 and 130.

For a given SMT problem 105, a pre-processing module 108 associated with SMT solver 150 generates a Boolean abstraction of non-Boolean constraints associated with the problem by determining symbolic bounds on the real variables set forth in the problem. These symbolic bounds (i.e., theory atoms) correspond to new Boolean variables in the abstraction. The abstraction represents a propositional formula of the problem 105 in which all of the theory atoms are replaced by new propositional variables. If the interval bounds established by the pre-processing module 108 during the production of the abstraction are found to be infeasible, a conflict clause is added to the abstraction and the SMT solver 150 starts over and attempts to solve the refined abstraction formula. However, if the refined abstraction is found to be unsatisfiable after interval contraction, the procedure stops entirely and returns an "unsatisfiable" result.

On the other hand, if the interval bounds are found feasible and the abstraction is deemed satisfiable, a DPLL(T)-based Boolean satisfiability (SAT) solver 110 is applied to a Boolean abstraction of the QFNR decision problem 105. The SAT solver 110 attempts to solve the problem 105 by navigating the search space of the Boolean abstraction or formula which was derived from the SMT problem 105. If the abstraction is Boolean-satisfiable, the SAT solver returns a satisfying assignment for all the Boolean variables. In this case, the set of theory atoms corresponding to the satisfying assignment of Boolean variables are checked for theory consistency using non-linear solver 120 and linear solver 130.

To determine theory consistency, the SAT solver interfaces with non-linear solver 120 and linear solver 130 theory for handling non-linear and linear constraints, respectively. Both theory solvers take a set of theory atoms as input and return a value which indicates whether the set of theory atoms is consistent. In preferred embodiments, a simplex-based solver is used to handle the linear constraints, while an interval constraint propagation (ICP) based solver is used to handle non-linear constraints. There is a tight integration between the linear and non-linear constraint solving phases that supports direct exchange of information to prune the search space.

More specifically, the interaction between linear and non-linear constraint solving phases is implemented as part of a set of checking procedures. Linear checking procedures (e.g., involving simplex-based operations) are first used to check the feasibility of the linear constraints within the bounds set on the real variables and to check for linear conflicts. If the linear constraints are unsatisfiable, then theory lemma is added to Boolean abstraction and DPLL solver searches for a new Boolean solution. If the linear constraints are satisfiable, then ICP is applied to check the feasibility of the non-linear constraints within the bounds. If the ICP solver cannot find a solution, then the theory lemma is added to Boolean abstraction and DPLL solver searches for a new Boolean solution. If the non-linear constraints are deemed to be feasible, ICP is used to generate a set of interval solutions for the variables. The solutions produced by ICP are further validated using the linear solver on the linear constraints. As used herein, a "solution box" or "interval solution" refers to a numerical interval range which has been assigned to a variable The validation steps include checking if the mid-point of the interval solution obtained from ICP solver is consistent with the linear constraints, and returning invalid result if not. Another check determines if the midpoint of the interval solution is at least a mid-point distance from the boundary of the linear feasible region, and returns an invalid result if not.

Otherwise, a valid result is returned. If the result is invalid, the linear constraints that caused the above checks to fail are identified as learned linear constraints.

If necessary, the abstraction generated for the QFNR problem is refined when a solution produced in the non-linear constraint solving phase cannot be validated. In this case, learned linear constraints are added to the ICP solver for searching different interval solutions. This iterative procedure of adding learned linear constraints to the ICP solver will terminate either when an interval solution produced by the ICP solver is determined to be valid or when the ICP solver cannot find a solution.

Figure 2:
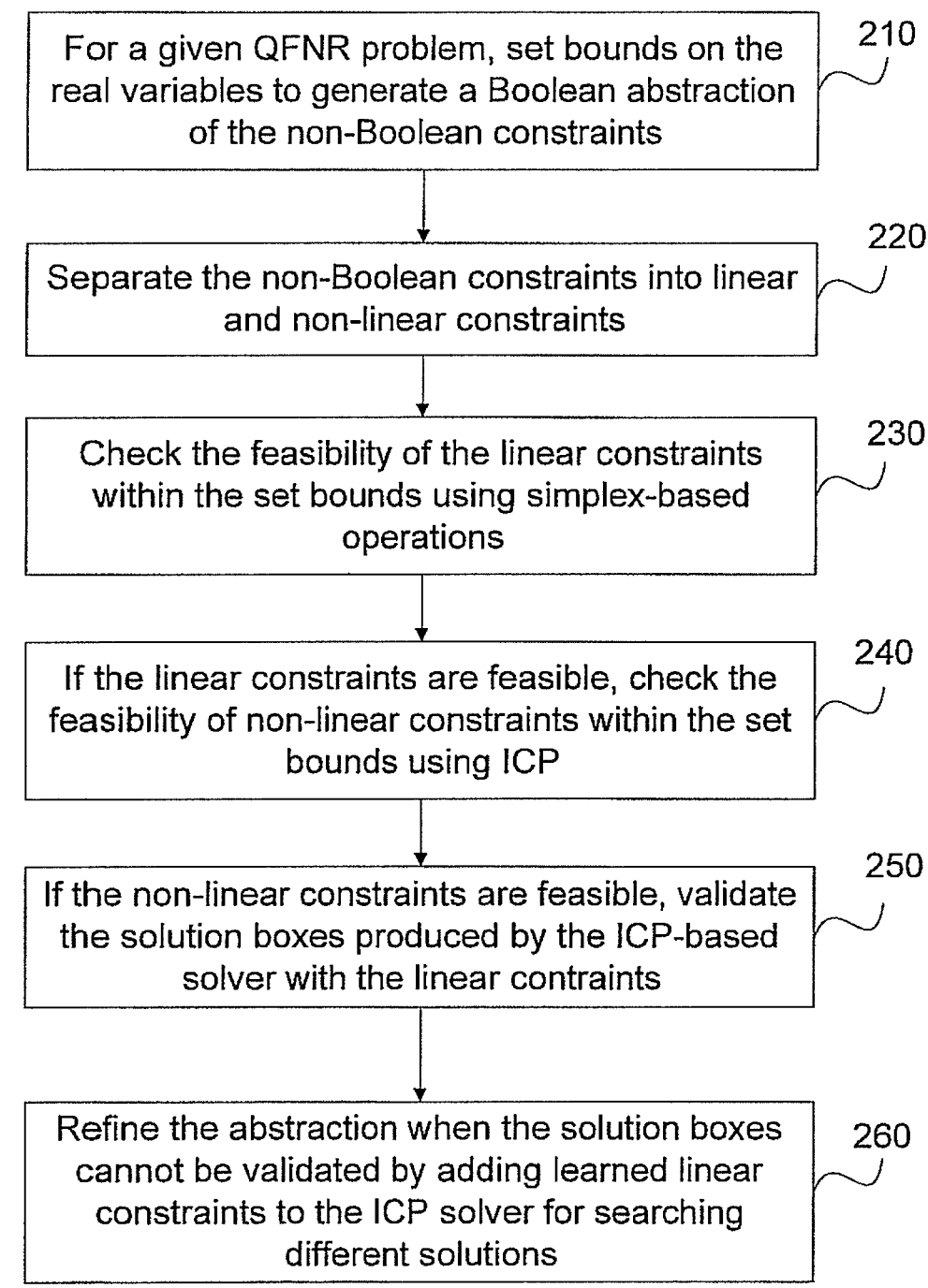
FIG. 2 is a block/flow diagram illustrating an exemplary method for implementing an SMT solver according to the present principles.

Moving on to FIG. 2, a block/flow diagram illustrates an exemplary method 200 for implementing an SMT solver 150 in accordance with the present principles. In block 210, bounds are set on the real variables of a QFNR problem 105 input to the SMT 150 to obtain a Boolean abstraction of the non-Boolean constraints associated with the problem 105.

At this point, essentially three possible courses of action may be taken depending upon whether the abstraction is satisfiable and whether the interval bounds are feasible. If the abstraction is not satisfiable, then the procedure ends and returns an "unsatisfiable" result. However, if the abstraction is satisfiable, the interval bounds are checked to determine whether they are feasible. If the interval bounds are infeasible, a conflict clause is added to the abstraction and the method restarts again at block 210. If, on the other hand, the interval bounds are feasible, the method proceeds to block 220 where the non-Boolean constraints are separated into linear and non-linear constraints.

Next, in block 230, simplex-based operations are applied to the linear constraints within the bounds established in block 210 to check for linear feasibility. This may be performed by the linear solver 130 shown in FIG. 1. As explained above, if the linear constraints are not feasible, then a theory lemma is added to the abstraction and the procedure restarts at block 210.

However, if the linear constraints are feasible, the method proceeds to block 240 where ICP-based operations are applied to the non-linear constraints within the bounds established for the real variables in block 210. This may be performed by the non-linear solver 120 shown in FIG. 1. If the ICP-based operations determine that the abstraction is unsatisfiable, then a theory lemma is added to the abstraction and the methods starts over in block 210. Alternatively, if the ICP operations determine that the abstraction is satisfiable, a set of feasible solution boxes are generated for each real variable.

Next, in block 250, simplex-based linear operations are applied to the solution boxes produced in block 240 in an attempt to validate the solutions. The feasibility of the linear constraints is checked against the solution boxes. If the solution box is validated using the linear constraints, the procedure terminates and a "satisfiable" result is returned. This may be performed by the linear solver 130.

Alternatively, if one or more of the linear constraints are not feasible, the solution boxes are iteratively refined using the simplex-based linear operations (block 260). Each time a solution box is deemed infeasible, at least one linear constraint is learned and the method jumps back to block 240 where the ICP solving procedures are applied to the combination of learned linear constraints and the set of non-linear constraints. If the ICP solving operations are unable to produce a new solution box during an iteration of the refinement process, a theory lemma is added to the abstraction and the method restarts in block 210.

Figure 3:
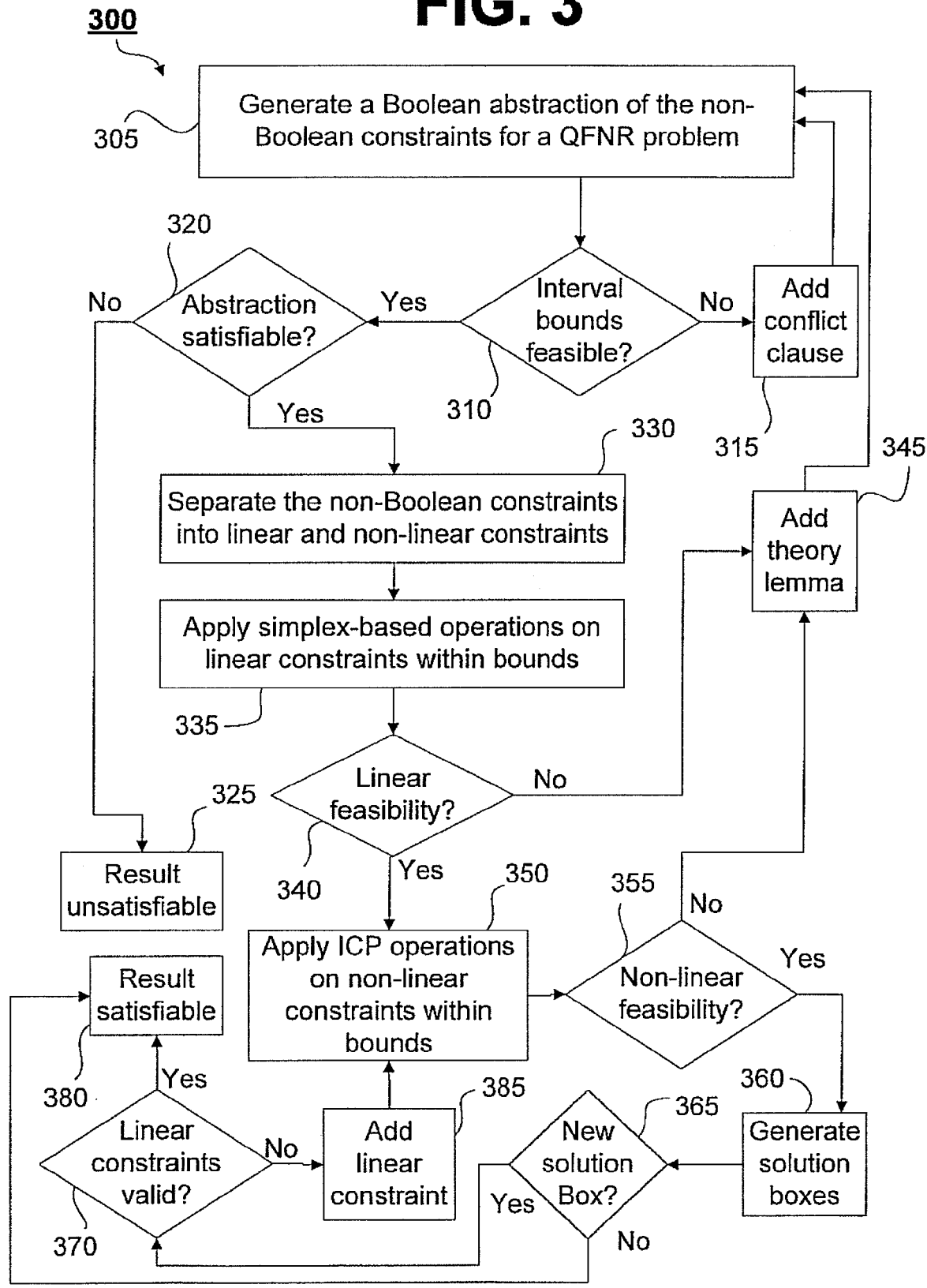
FIG. 3 is a block/flow diagram illustrating another exemplary method for implementing an SMT solver according to the present principles.

A more detailed method for implementing an SMT solver 150 in accordance with the present principles is described in FIG. 3. The method begins in block 305 where a Boolean abstraction of the QFNR problem is obtained by adding theory atoms. Once the abstraction is obtained, the method proceeds to decision block 310 where a determination is made as to whether the bounds associated with the theory atoms are feasible. If the bounds are not feasible, the method proceeds to block 315 where a conflict clause is added to the abstraction and the method returns to block 305.

In the case where the theory atoms are determined to be feasible, the method proceeds to decision block 320 where the SAT solver makes a determination as to whether the abstraction (which was generated in block 305) is satisfiable. If the abstraction is found to be unsatisfiable, the method proceeds to block 325 where an "unsatisfiable" result is returned and the method terminates. Otherwise, the method proceeds to block 330 where the linear and non-linear constraints associated with the abstraction are separated.

Next, in block 335, simplex-based operations are applied to the linear constraints within the interval bounds set by the theory literals in block 305. If the linear constraints are non-feasible in decision block 340, a theory lemma is added to the abstraction and method jumps back to block 305. On the other hand, if it is determined that the linear constraints relate to a feasible solution in block 340, then the method proceeds to block 350 where ICP operations are applied to the non-linear constraints within the interval bounds established in block 305.

Based on the application of ICP in block 350, a determination is made as to whether the non-linear constraints are satisfiable (block 355). If the constraints are determined to be unsatisfiable, the method proceeds to block 345 where a theory lemma is added to the abstraction and the method starts over. Alternatively, if the constraints are determined to be satisfiable, at least one solution box will be generated for the real variables (block 360). Once a solution box is generated using ICP, a preliminary check is performed in block 365 to determine whether ICP was able to find a new solution. Decision block 365 will always return an affirmative answer the first time ICP is applied to the non-linear constraints. If the solution box found is not new, it returns a satisfiable result in block 380.

In the case where a solution box(es) generated by ICP represent a new solution box, validation is performed to determine whether the linear constraints are feasible within the interval solution defined by the solutions box (block 370). Specifically, the validation may involve performing two different checks. A first check is performed to determine if the mid-point of the interval solution obtained from ICP solver is consistent with the linear constraints. An invalid result is returned if there is no consistency. A second check is performed to determine if the midpoint of the interval solution is at least a mid-point distance from the boundary of the linear feasible region. If this second check fails, an invalid result is returned once again and the linear constraints that caused the check to fail are identified as learned linear constraints. Alternatively, if both checks are satisfied, a valid result is returned.

If one or more of the linear constraints are not feasible, a linear constraint is added to the set of non-linear constraints (block 385) and the method proceeds back to block 350 where ICP is applied to the appended set of non-linear constraints. As can been seen, the path from block 350 to block 385 serves as a loop which iteratively refines the solution boxes generated by ICP.

On the other hand, if it is determined in block 370 that the linear constraints are feasible within the interval solution defined by the solutions boxes, then the result is deemed to be "satisfiable" (block 380) and the method terminates.

Having described the present principles with reference to FIGS. 1-3 above, a more detailed discussion is now provided regarding the implementation of the DPLL(T)-based framework employed by the present principles.

As explained above, the DPLL(T)-based framework described herein employs an SAT solver 110 and two theory solvers (i.e., non-linear solver 120 and linear solver 130) to solve an SMT problem 105. The SMT problem 105 is a quantifier-free first order formula $\phi$ with atomic formulas specified by the signature of some theory T. A Boolean-abstraction $\phi^B$ of the formula $\phi$ is first computed as described above with respect to blocks 210 and 205 of FIGS. 2 and 3, respectively.

More specifically, to generate abstraction $\phi^B$, two sets of auxiliary variables are introduced: a set of nonlinear variables V and a set of slack variables S. A nonlinear variable $x_i \in V$ is introduced when a nonlinear term $t_i$ appears for the first time in the formula. The variable $t_i$ is replaced by $x_i$ and an additional atomic formula $(t_i = x_i)$ is added to the original formula as a new clause. Similarly, a slack variable $s_i \in S$ is introduced for each atomic formula $p_i \diamond c_i$, where $p_i$ is not a single variable. Then, $p_i$ is replaced by $s_i$, and $(p_i = s_i)$ is added to the original formula. To give an example, consider the following formula $\phi$:

$$x^2 + y \geq 10 \wedge x \cdot z < 5) \vee y + z > 0$$

If nonlinear variables are introduced for the nonlinear terms $x^2$ and $x \cdot z$, the formula becomes:

$$x^2 = x_1 \wedge x \cdot z < x_2) \wedge ((x_1 + y \geq 10 \wedge x_2 < 5) \vee y + z < 0)$$

Next, slack variables are added into the formula. After slack variables are added, the resulting formula is:

$$\underbrace{(x^2 = x_1 \wedge x \cdot z = x_2)}_{N_\varphi} \wedge$$

$$\underbrace{(x_1 + y = s_1 \wedge y + z = s_2)}_{M_\varphi} \wedge \underbrace{((s_1 \geq 10 \wedge x_2 < 5) \vee s_2 < 0)}_{\varphi'}$$

This new formula is equi-satisfiable with the original formula. There are three parts in the new formula. $N_\phi$ refers to a "nonlinear table" which includes all of the nonlinear constraints. $M_\phi$ is referred to at the "matrix" and includes all the linear constraints. Collectively, $N_\phi \wedge M_\phi$ represents an "extended matrix" of the formula. The original Boolean structure in $\phi$ is now included in $\phi'$, whose atomic formulas become simple numerical bounds on variables.

The benefit of generating the above abstraction is significant. The general matrix of a formula is fixed during the DPLL(T) search, and therefore, all that is needed to do is to check whether sets of simple bounds on variables can be consistent with the general matrix. This preprocessing technique significantly outperforms earlier linear solvers based on incremental simplex procedures, for at least the reason that it allows for much simpler data structures and more efficient solving operations for all procedures (checking, learning, backtracking, etc.) in theory solving.

When preprocessing is performed in the manner described above, any preprocessed input formula $\phi$ is of the form:

$$\underbrace{\bigwedge_{i=1}^{n} v_i}_{N_\varphi} \wedge \underbrace{\bigwedge_{i=1}^{m} \mu_i}_{M_\varphi} \wedge \underbrace{\bigwedge_{j=1}^{p} \left( \bigvee_{i=1}^{q} l_{ji} \right)}_{\varphi'} \quad (1)$$

In the above formula, $V = \{x_i, \ldots, x_k\}$ represents the set of all the variables appearing in $\phi$. In $N_\phi$ each atom $v_i$ is of the form $x_{i_0} = f_i(x_{i_1}, \ldots, x_{i_r})$, where $x_{i_j} \in V$, and $f_i$ a nonlinear function that does not contain addition or subtraction. In $M_\phi$ each atom $\mu_i$ is of the form $\Sigma a_{i_j} x_{i_j} = 0$, where $a_{i_j} \in R$ and $x_{i_j} \in V$. In $\phi'$, each atom $l_i$ is of the form $(x_j \sim c_i)$ or $\neg (x_j \sim c_i)$, where $x_j \in V$, $c_i \in R$ and $\sim \in \{>, \geq, =\}$. All the $v_i$s and $\mu_i$s represent constraints (nonlinear or linear, respectively), while $l_i$s represents literals. The variables appearing in a constraint or literal $\alpha$ is written as $V(\alpha)$. Variables that appear in $N_\phi$ and $M_\phi$ are distinguished by $V_N = \cup_i V(v_i)$ and $V_M = \cup_i V(\mu_i)$. Note that $V_N$ and $V_M$ overlap.

After the formula $\phi$ is preprocessed to generate a Boolean abstraction $\phi^B$ in the form shown in Equation 1 above, the SAT solver 110 is applied to the abstraction $\phi^B$, which now represents the propositional formula with all the theory literals replaced by new propositional variables. If $\phi^B$ is Boolean-satisfiable, the SAT solver 110 should return a satisfying assignment for all the Boolean variables. Since the Boolean variables correspond to theory literals, a check is performed to determine whether the set of theory literals is consistent, i.e., whether the satisfying assignment for Boolean variables is realizable.

In determining whether the satisfying assignment is realizable, the linear and non-linear theory solvers 120 and 130 discussed above take a set of theory literals as input and return a value which indicates whether the set is consistent (e.g., as in blocks 230 and 240 of FIG. 2). If the set is consistent, the original formula $\phi$ is satisfiable. Otherwise, if the set is inconsistent, this means that the corresponding Boolean assignment is spurious. As a result, the SAT solver 110 searches for a different satisfying assignment and continues to loop until all possible satisfying assignments are exhausted.

The theory solvers 120 and 130 preferably employ two different checking procedures, referred to herein as "Check( )" and "Assert( )" procedures. The Check( ) procedure decides whether there exists a common solution to the theory atoms, i.e., whether a set of theory atoms is consistent. However, before the Check( ) operations are performed, the Assert( ) procedure is run as partial check procedure which takes an incomplete set of theory atoms and returns a value indicating whether there is an evident conflict. The Assert( ) procedure works cheaply and incrementally, while the Check( ) procedure is more sound and complete.

If the Check( ) procedure determines that the asserted set of theory atoms is consistent, it means that a satisfying assignment for the propositional abstraction of the original formula can be witnessed by suitable values for the real variables. In this case, the SMT solver 150 has no more work to do and, therefore, terminates returning a final answer which indicates that the formula is satisfiable.

On the other hand, if the checking procedures determine that the set of theory literals is inconsistent, the checking procedures not only provide a simple decision, but also provide explanations for the conflict so that a clause can be learned for refining the search space (for example, as described above in block 260 of FIG. 2). Further, when conflicts occur and the SAT solver 150 needs to backtrack, the theory solvers provide methods for efficient backtracking on the theory literals.

The Assert( ) and Checking( ) procedures referred to above are now described in further detail. As briefly mentioned above, the Assert( ) procedure provides a partial check for the sets of theory literals alongside SAT solving. Its goal is twofold: to detect early inconsistency in the set and to prune the search space before the full Check( ) procedure is called. Since it is called every time a Boolean variable is asserted by the SAT solver. This can be performed cheaply, incrementally, and soundly.

The Assert( ) procedure implements interval contraction with respect to consistency conditions. The idea is to start with an interval assignment for the variables, and maintain consistency conditions so that parts of the intervals can be safely pruned if they do not correspond to a viable solution.

The procedure is formally specified as follows. Let $\Lambda$ be the set of asserted literals, which is updated by DPLL(T)-search on $\phi'$. Each variable $x_i \in V(\Lambda)$ has an interval assignment $I_i$. Note that each variable $x_i$ appearing in $\Lambda$ is introduced by literals of the form $x_i \sim c_i$. Let $I=(I_1, \ldots, I_n)$ be the vector of interval assignment for all the variables in $V(\Lambda)$.

In each call of Assert( ) a new literal $v \sim c$ is about to be added to $\Lambda$. The vector of interval assignment I is first updated by l. Then, Assert( ) contracts the interval assignment I with respect to the extended matrix, i.e., linear and nonlinear constraints in $N_\phi$, and $M_\phi$. That is, the Assert( ) procedure takes I as input and outputs a new vector of intervals I', such that I'=#I and (I, I') $\in$ C. I' can be empty, which represents inconsistency in $\Lambda$. As explained in further detail below, the solver learns and backtracks from this inconsistency. Otherwise, Assert( ) returns the new vector of interval assignment I' which is used for the next call to the Assert( ) procedure.

Given that all the constraints in the extended matrix remain fixed after preprocessing, it would be expensive to iterate through all the constraints for each run of Assert( ). Therefore, the SMT solver 150 only adds in constraints that are relevant to the asserted literals. Let $\Gamma$ represent the set of constraints that are considered for interval contraction. As $\Lambda$ is updated by the SAT solver 110, the theory solvers update (the initially empty) $\Gamma$ based on the following rules:

Rule 1: A nonlinear constraint is added when one of its variables appears in the asserted literals. Hence:

$$\frac{\exists v \in V(v), \exists l \in \Lambda \text{ such that } v \in V(l)}{\Gamma := \Gamma \cup \{v\}}$$

Rule 2: Linear constraints are not invoked unless bounds on all their variables have been asserted. Hence:

$$\frac{\forall v \in V(\mu), \exists l \in \Lambda \text{ such that } v \in V(l)}{\Gamma := \Gamma \cup \{\mu\}}$$

Rule 3: Contraction terminates unless significant progress is made in each step. To this end, it is preferred that, heuristically, the middle point of an interval is excluded in each step of the contraction. Otherwise, the contraction is terminated. This enforces fast narrowing on the interval, which prevents the process from lingering on hard-to-contract intervals, while easy conflicts are quickly detected.

The last rule (Rule 3) enforces the Assert( ) procedure to halt unless one interval assignment is reduced to less than half in size. Hence, the procedure either keeps reducing intervals until the precision limit is reached, or when no significant progress is made. It terminates in both cases.

The Assert( ) procedure is sound, i.e., no consistent set of literals will be determined unsatisfiable. In fact, Assert( ) always keeps all the possible solutions to the literal set $\Lambda$. This is due to the fact that the initial intervals include (and hence overapproximate) the set of all solutions to the literal set, and the Assert( ) operation applies interval contraction under consistency conditions with respect to $\Gamma$, which is always a subset of the full constraint set in $N_\phi \wedge M_\phi$. It is ensured that the returned intervals still over-approximate the set of all solutions to $\Lambda \cup \Gamma$, and hence all solutions to $\Lambda$ with respect to $N_\phi \wedge M_\phi$.

Once the Assert( ) procedure has been performed, the more thorough Check( ) procedure is run. Since linear feasibility checking is efficient and accurate, in comparison to nonlinear solving which gives approximations and is less efficient, ideally it is preferred to postpone nonlinear solving as much as possible. Hence, linear constraints are checked for feasibility, so that easy linear conflicts can be detected early (e.g., as using linear solver 130). After linear feasibility has been confirmed, the non-linear solver 120 is invoked to check whether the non-linear constraints are satisfiable given the linear constraints. In other words, a solution to the non-linear constraints is searched for in the feasible region defined by the linear constraints.

The standard efficient linear solving procedure based on simplex maintains and updates one feasible point throughout the solving process. Hence, extra computation is needed to obtain the feasible region. One way of doing this is to use the optimization part of the simplex operation, and collect the bounds on linear variables that are involved in the non-linear constraints. However, this approach is problematic in two ways.

First, this approach leads to significant overhead due to the fact that obtaining the feasible region requires solving at least two linear optimization problems involving all the constraints for every variable. Second, and more importantly, the bounds on variables constitute a "box-over-approximation" of the linear feasible region which can be too coarse. After obtaining a non-linear solution within the box, the solution should be checked to determine whether it resides in the real feasible region. These problems render the above approach defective.

Therefore, the present principles apply to more subtle interaction procedures between the linear and non-linear solving stages. The linear solving procedures are employed to check for easy conflicts and to validate solution intervals returned by ICP. The set of constraints considered by ICP is incrementally expanded based on the explanations for conflicts supplied by the linear solver 130. The main steps are as discussed below.

Recall that the Check( ) procedure takes a set of theory atoms as input which constitute a full satisfying assignment to the Boolean abstraction of the formula $\phi$. After $\phi$ is preprocessed, $N_\phi$ represents the nonlinear table of the formula and $M_\phi$ represents the linear matrix. After the Assert( ) procedure, each variable $x_i \in V(\phi)$ is assigned an interval $I_i=[a_i, b_i]$. Hence, the set of theory atoms are updated to $\Lambda'=\{a_i \leq x_i \leq b_i: x_i \in V(\Lambda)\}$, which represents a more refined over-approximation of the set of all satisfying assignments for $N_\phi \wedge M_\phi \wedge \Lambda$. In the following explanation, whenever the solver returns "unsatisfiable", clause-learning and backtracking is then performed.

First, feasibility of the linear constraints, i.e., the satisfiability of $M_\phi \wedge \Lambda'$ is checked using the usual linear solving operations such as simplex-based operations (as in block 230 of FIG. 2 and block 225 of FIG. 3). If the linear constraints are unsatisfiable, the solver returns "unsatisfiable".

Next, if the linear constraints are consistent, ICP is performed directly on the set of nonlinear constraints (without fixing the linear feasible region) as described briefly above with respect to block 240 of FIG. 2 and block 350 of FIG. 3. In other words, a check is performed to determine the satisfiability of the formula $N_\phi \wedge \Lambda'$. If ICP determines that the nonlinear constraints are inconsistent, the solver returns "unsatisfiable".

On the other hand, if ICP determines that the formula is satisfiable, the solver returns a satisfying interval assignment for all variables in $V_N \cup V(\Lambda)$. Since the procedure does not start with the linear constraints in $M_\phi$, it is possible that the interval assignment I on the variables forms a hyper-box lying outside the linear feasible region. This means that the solution may be spurious and needs to be validated.

Validation is carried out to determine whether the linear constraints are feasible within the interval solution defined by the solutions boxes as mentioned above in describing block 250 of FIG. 2 and block 370 of FIG. 3. Specifically, the validation steps include checking if the mid-point of the interval solution obtained from ICP solver is consistent with the linear constraints, and returning invalid result if not. Namely, for interval assignment on each variable $x_i$ as $[l_i, u_i]$, it is checked whether the formula $\psi = M_\phi \wedge \Lambda \wedge \Lambda \wedge [x_i = l_i + u_i/2]$ [Note: $(l_i + u_i)/2$] is satisfiable. This can be efficiently done because of the incremental nature of the linear feasibility checking procedure. If the result is unsatisfiable (i.e., the midpoint of the solution box is outside the linear feasible region), the interval solution is deemed spurious. In this case, the solver identifies the violated linear constraints (e.g., as in block 385 of FIG. 3) and passes them to the ICP solver (e.g., as in block 350 of FIG. 3).

In the case where the result of the linear solver is satisfiable, a satisfying assignment on each linear variable $y_i = b_i$ is obtained. A check is performed to determine if the midpoint of the interval solution is at least a mid-point distance from the boundary of the linear feasible region. If not, an invalid result is returned; otherwise, a valid result is returned. Namely, for the interval assignment on each variable $x_i$ as $[l_i, u_i]$ and the value assignment on each linear variable $y_i$ as $b_i$, it is performed to determine if each linear constraint $\vec{c}_j^T \vec{x} \leq e_j + \vec{d}_j^T \vec{y}$ in $M_\phi \wedge \Lambda \wedge \Lambda$ is satisfied for $\vec{y} = \vec{b}$ and $\vec{x} = \vec{a}$ where $\vec{y} = (y_i \ldots y_m)$, $\vec{b} = (b_i \ldots b_m)$, $\vec{x} = (x_i \ldots x_n)$, $\vec{a} = (a_i \ldots a_n)$, $\vec{c} = (c_i \ldots c_n)$, $\vec{d} = (d_i \ldots d_m)$ satisfying $a_i = l_i$ when $c_i \leq 0$ and $a_i = u_i$ otherwise.

The observation is that the maximum of each $\vec{c}_j^T \vec{x}$ is obtained when the x variables take the min or max values in their intervals depending on the coefficients. It is to be noted that the satisfiability of a linear constraint is guaranteed if the max value of $e_j + \vec{d}_j^T \vec{y}$ is bounded by the linear constraints $e_j + \vec{d}_j^T \vec{y}$.

If any linear constraint fails the check, the solution box is deemed unsatisfiable, and the linear constraints that failed in the above checks are identified as learned linear constraints. If all of the linear constraints are satisfied, it is guaranteed that the interval solution resides in the linear feasible region (without losing soundness). In this manner, the interval assignment is validated, and the full assignment is returned as a solution to the set of theory literals.

In the alternate case where the interval assignment is not validated by the linear constraints, a search is performed for a different solution for the nonlinear constraints combined with the added learned constraints. The new solution should not violate the same linear constraints, which means that the set of input constraints for ICP should be expanded to take the violated linear constraints into account.

For example, consider the case where the formula $\psi$ fails the linear feasibility checking. Given such, there exists a linear constraint $\mu_i$ of the form of $$x_i = \sum_{a_{ij} < 0} a_{ij} x_j + \sum_{a_{ik} > 0} a_{ik} x_k$$

such that the bounds on $x_i$ are conflicting with the bounds on $x_j$ and $x_k$. Any linear constraints that include variables that appear in $\mu_i$ are added to the constraint set of ICP:

$$N_\phi := N_\phi \cup \{\mu_i : \exists v \in V(\mu) \text{ such that } v \in V(\mu_i)\}.$$

At this point, ICP is applied again on formula $N_\phi \wedge \Lambda \wedge \Lambda'$ and then the procedure once again attempts to validate the non-linear constraints using the linear constraints. By adding more linear constraints than just $\mu_i$, the number of iterations is reduced and it is ensured that only relevant linear constraints are considered.

With respect to generating explanations and backtracking, the theory solvers are expected to provide explanations for the conflict so that a learned clause can be added to the original formula when an inconsistent set of theory atoms is observed, and then to backtrack to a consistent set. To be used as learned clauses, the explanations should include only atomic formulas in the preprocessed original formula $\phi'$, that is, of the form v~c.

There are several different cases where the theory solver returns "unsatisfiable" as an answer:

Case 1: An interval is contracted to the empty set during the Assert( ) checking procedure. In this case, only interval contraction has been used.

Case 2: The linear solver 130 determines that the linear feasibility region is empty during the Check( ) procedure, i.e., the linear constraints are inconsistent before non-linear checking is needed. In this case, interval contraction and linear feasibility checking have been used.

Case 3: The non-linear solver 120 determines that the non-linear constraints are inconsistent with the asserted intervals during the Check( ) procedure. In this case, interval contraction and interval splitting have been used.

Case 4: All the solutions that the non-linear solver 130 obtained have been rejected by the linear solver during the Check( ) procedure. In this case, interval contraction, interval splitting, linear feasibility checking and linear learning have been used.

Interval contraction is the common process that occurs used in all four cases, and is also the problematic one. This process hinders the ability to obtain the initial literals directly. This is due to the fact that all initial intervals of variables have been contracted, and during the contraction process the interval values for different variables may have affected each other with respect to linear and non-linear constraints. To address this problem, the present principles track the contraction steps for each interval, thus allowing the process to recover the sets of literals that have contributed to the contraction of each interval.

To accomplish the above, appropriate backtracking procedures may be implemented. More specifically, when an inconsistent set $\Lambda$ of literals is detected by either Assert( ) or Check( ) the solver calls the SAT solver 110 to backtrack to a subset $\Lambda'$ of $\Lambda$, and to prepare to assert new literals. The theory solver should assist backtracking by eliminating all the decisions based on literals in $\Lambda \backslash \Lambda'$, and restoring the solver state back to the check point p after $\Lambda'$ is checked by Assert( ). Since the Assert( ) procedure stores interval assignment I during the contraction process, this can be accomplished by restoring the interval assignment to $I_p$ at the check point p. Since at each assertion step one interval value is kept for each variable, for formulas with k variables and n literals, the space requirement for Assert( ) to store such information and support backtracking is O(nk).

Regarding strict inequalities, linear strict inequalities are handled with the help of a small enough "infinitesimal parameter". A similar strategy is adopted to handle non-linear strict inequalities. Since the non-linear constraints are handled using interval arithmetic, this corresponds to extending interval arithmetic from closed intervals to open intervals. Operations on open intervals are not usually defined in numerical algorithms, since the focus is on obtaining solutions, and open intervals do not introduce more significant numerical errors than is assumed in the solving procedure. However, in solving SMT problems the primary concern is about feasibility, where errors in handling strict inequalities should be undesirable.

First, the properties of the infinitesimal parameter are formally defined. The idea is to introduce a formal infinitesimal element $\epsilon$, in much the same way as in non-standard analysis (NSA). Yet instead of requiring $\epsilon$ to be smaller than any positive real number as in NSA, the present principles employ alternate rules as described below.

Assume $\epsilon$ is a formal parameter incomparable to any machine representable real number (but is intuitively strictly positive). Let c be any positive machine representable number. Some (machine) arithmetic operations on $\epsilon$ are defined as follows:

$$0 \cdot \epsilon = 0$$

$$(\pm c) \cdot \epsilon = \pm \epsilon$$

$$\epsilon \cdot \epsilon = 0$$

$$\sqrt[n]{\epsilon} = 0 (n \in N^+)$$

Other arithmetic operations on $\epsilon$ are kept as formal expressions with no evaluation defined.

Thus, $R_\epsilon = R \cup \{\epsilon\} = \{a + k\epsilon : a \in \{-1, 0, 1\}\}$ wherein $R_\epsilon$ is defined in the manner provided below.

Let $<_R$ be the regular linear order on R. The ordering < on $R \cup \{\epsilon\}$ is defined as: $a + k\epsilon <_R b + k'\epsilon$ if $a <_R b$ or $a = b$ and $k <_R k'$. The correctness of using c: is guaranteed by the following proposition: Let $\Gamma$ be a set of nonlinear constraints and $S \subset \Gamma$ consists of strict nonlinear inequalities $p_1 > 0, \ldots, p_n > 0$. Then $\Gamma$ is satisfiable over R iff $\Gamma' = (\Gamma \cup S_\epsilon) | S$ is satisfiable over $R_\epsilon$ where $S_\epsilon = \{p_1 \geq \epsilon, \ldots, p_n \geq \epsilon\}$. Hence, for convenience, $R_\epsilon$ is still written as R.

The $\epsilon$-representation of an interval I, written as $I^\epsilon$, is defined as:

$I = [a, b]$ then $I^\epsilon = [a, b]$;

$I = (a, b)$ then $I^\epsilon = [a + \epsilon, b - \epsilon]$;

$I = (a, b]$ or $[a, b)$, then $I^\epsilon = [a + \epsilon, b]$ or $[a, b - \epsilon]$, respectively.

The closure of a non-closed interval I is written as as $\bar{I}$, and this is used this prove the theorem: Let $I_1$ and $I_2$ be two open intervals, and $\circ$ denote one of $\oplus, \ominus, \otimes, (/)$. Hence, the result is: $I_1^\epsilon \circ I_2^\epsilon = (\bar{I}_1 \circ \bar{I}_2)^\epsilon$.

The above manner of handling strict inequalities guarantees that the infinitesimal symbol $\epsilon$ can be manipulated in interval arithmetic without much cost since all of the open and half-open intervals can be treated as closed intervals in interval arithmetic, and the result can be directly put into $\epsilon$-forms by adding $\epsilon$ in suitable places.

In view of the above disclosure, it should be recognized that the SMT solver 150 of the present application provides for a number of advantages over conventional solvers for non-linear operations on real numbers, particularly with respect to efficiency, accuracy and scalability.

Efficiency: For conventional solvers dealing with non-linear operations on real numbers, linear and nonlinear constraints are handled in the same manner. In accordance with the present principles, linear constraints may be handled in a completely different manner that is complete, accurate, and much more efficient. Thus, the separation and efficient interaction between linear and nonlinear solving as described above significantly enhances efficiency.

Accuracy: The above-described solver is designed to ensure better numerical accuracy. This is achieved by using accurate linear solving, linear validation of nonlinear interval solutions, as well as infinitesimal calculus for handling strict inequalities. As a result, accurate answers can be provided in many practical cases where conventional solvers would return false answers.

Scalability: Compared with conventional solvers, the present solver is more scalable because it does not require any "linearization" encoding of non-linear constraints. In general, linearization leads to large formula constraints, nullifying the gains from the improvements in typical SMT solvers.

Having described preferred embodiments of a system and method for a SMT solver (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for deciding the satisfiability of a non-linear real decision problem, comprising:
   generating a Boolean abstraction of non-Boolean constraints for the problem by determining symbolic bounds on real variables set forth in the problem;
   separating linear and non-linear constraints;
   determining feasibility of linear constraints using a simplex-based linear solver;
   if the linear constraints are feasible, determining feasibility of non-linear constraints using a non-linear solver which employs interval constraint propagation (ICP); and
   validating solution boxes obtained from the non-linear solver using the simplex-based linear solver;
   learning at least one linear constraint for each solution box that is determined infeasible;
   repeating said step of determining feasibility of non-linear constraints using the non-linear constraints and the learned constraints; and
   refining the Boolean abstraction by adding a theory lemma if the solution boxes cannot be validated.

2. The method of claim 1, further comprising learning linear constraints to refine a search space associated with the problem if the solutions cannot be validated.

3. The method of claim 2, further comprising iteratively solving the non-linear constraints combined with the learned linear constraints using the non-linear solver until either a feasible solution is obtained or no solution is possible.

4. The method of claim 1, wherein the feasibility of the linear constraints is determined using a linear real arithmetic solver which employs simplex-based operations.

5. The method of claim 1, wherein validating involves checking whether a mid-point of a solution box is consistent with the linear constraints.

6. The method of claim 5, wherein an invalid result is returned if the mid-point of the solution box is not consistent with the linear constraints.

7. The method of claim 1 wherein validating involves checking if a midpoint of a solution box is at least a mid-point distance from a boundary of the linear feasible region.

8. The method of claim 1, wherein validating includes identifying linear constraints that failed in validating a solutions box.

9. The method of claim 1, wherein non-linear infinitesimal calculus is applied to handle strict inequalities encountered when ICP is applied to the non-linear constraints.

10. A system for deciding the satisfiability of a non-linear real decision problem, comprising
   a pre-processing module configured to generate a Boolean abstraction of non-Boolean constraints for the problem by determining symbolic bounds on real variables set forth in the problem and to separate linear and non-linear constraints;
   a simplex-based linear solver configured to determine feasibility of linear constraints, to validate solution boxes obtained from a non-linear solver, to learn at least one linear constraint for each solution box that is determined infeasible, and to refine the Boolean abstraction by adding a theory lemma if the solution boxes cannot be validated;
   a non-linear solver configured to determine feasibility of non-linear constraints using interval constraint propagation (ICP) if the linear solver finds the linear constraints to be feasible and to repeat the feasibility determination of non-linear constraints using the non-linear constraints and the learned constraints.

11. The system of claim 10, wherein linear constraints are learned to refine a search space associated with the problem if the solutions cannot be validated.

12. The system of claim 11, wherein the non-linear solver iteratively solves the non-linear constraints along with the learned linear constraints until either a feasible solution is obtained or no solution is possible.

13. The system of claim 10, wherein the linear solver comprises a linear, real arithmetic solver which employs simplex-based operations to determine the feasibility of the linear constraints.

14. The system of claim 10, wherein validating involves checking whether a mid-point of a solution box is consistent with the linear constraints.

15. The system of claim 14, wherein an invalid result is returned if the mid-point of the solution box is not consistent with the linear constraints.

16. The system of claim 10, wherein validating involves checking if a midpoint of a solution box is at least a mid-point distance from a boundary of the linear feasible region.

17. The system of claim 10, wherein the linear solver identifies linear constraints that failed in validating the solution boxes.

18. The system of claim 10, wherein non-linear infinitesimal calculus is applied to handle strict inequalities encountered when ICP is applied to the non-linear constraints.

19. A non-transitory computer readable storage medium comprising a computer readable program, wherein the computer readable program when executed on a computer causes the computer execute the steps of:
   generating a Boolean abstraction of non-Boolean constraints for the problem by determining symbolic bounds on real variables set forth in the problem;
   separating linear and non-linear constraints;
   determining feasibility of linear constraints using a simplex-based linear solver;
   if the linear constraints are feasible, determining feasibility of non-linear constraints using a non-linear solver which employs interval constraint propagation (ICP); and
   validating solution boxes obtained from the non-linear solver using the simplex-based linear solver;
   learning at least one linear constraint for each solution box that is determined infeasible;
   repeating said step of determining feasibility of non-linear constraints using the non-linear constraints and the learned constraints; and
   refining the Boolean abstraction by adding a theory lemma if the solution boxes cannot be validated.

* * * * *